Dec. 2, 1969    J. D. TETRICK    3,481,106
WRAPPER CLOSING APPARATUS
Filed Nov. 13, 1967    2 Sheets-Sheet 1
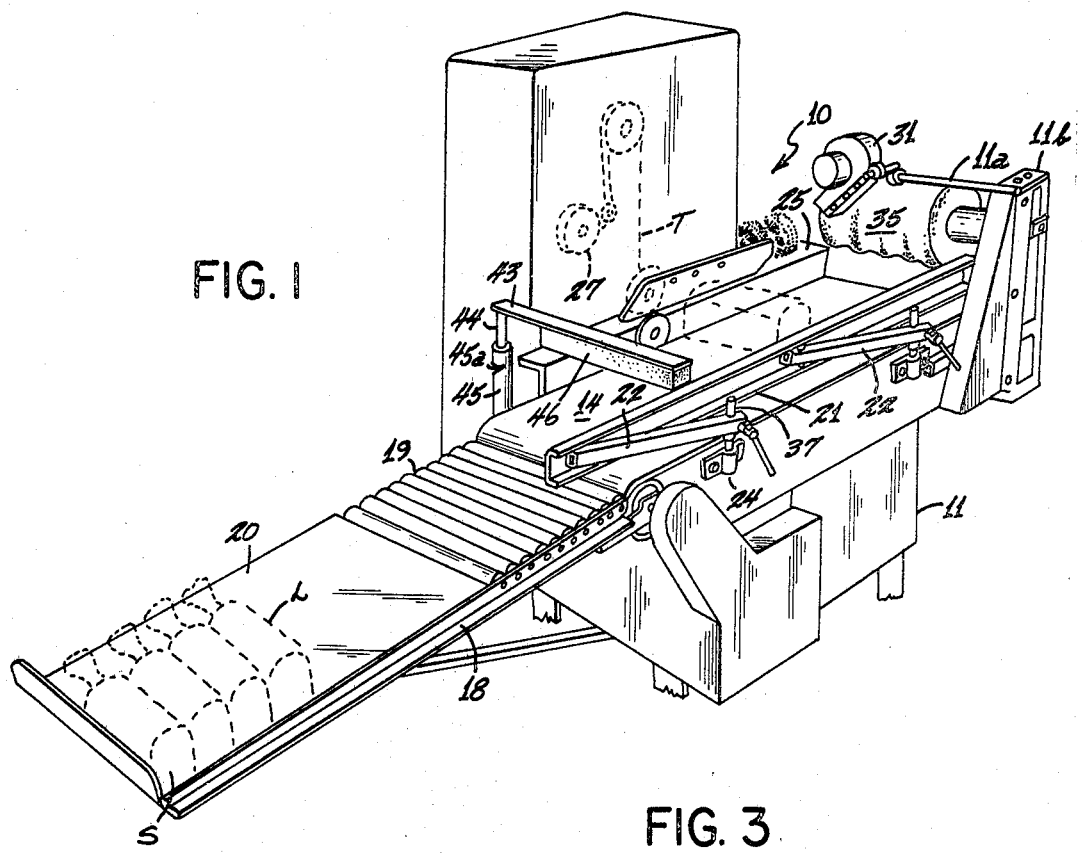
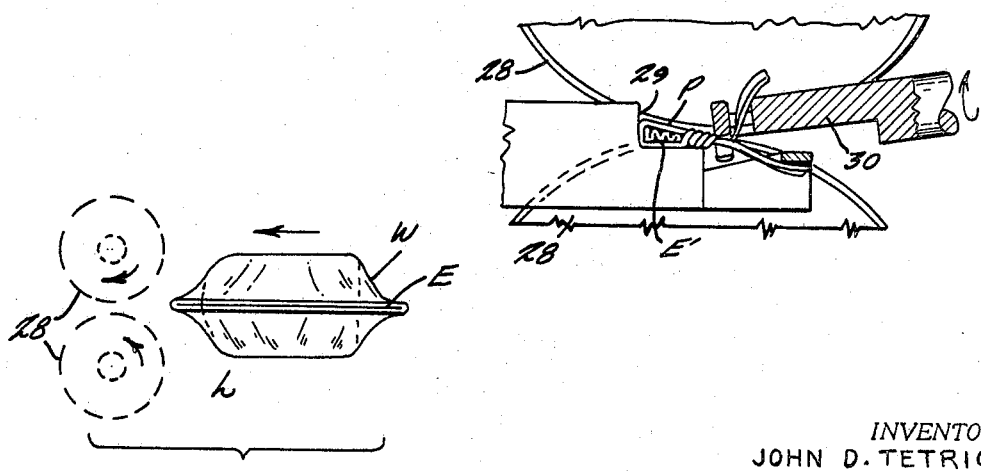
INVENTOR.
JOHN D. TETRICK
BY
Williamson, Palmatier & Bains
ATTORNEYS

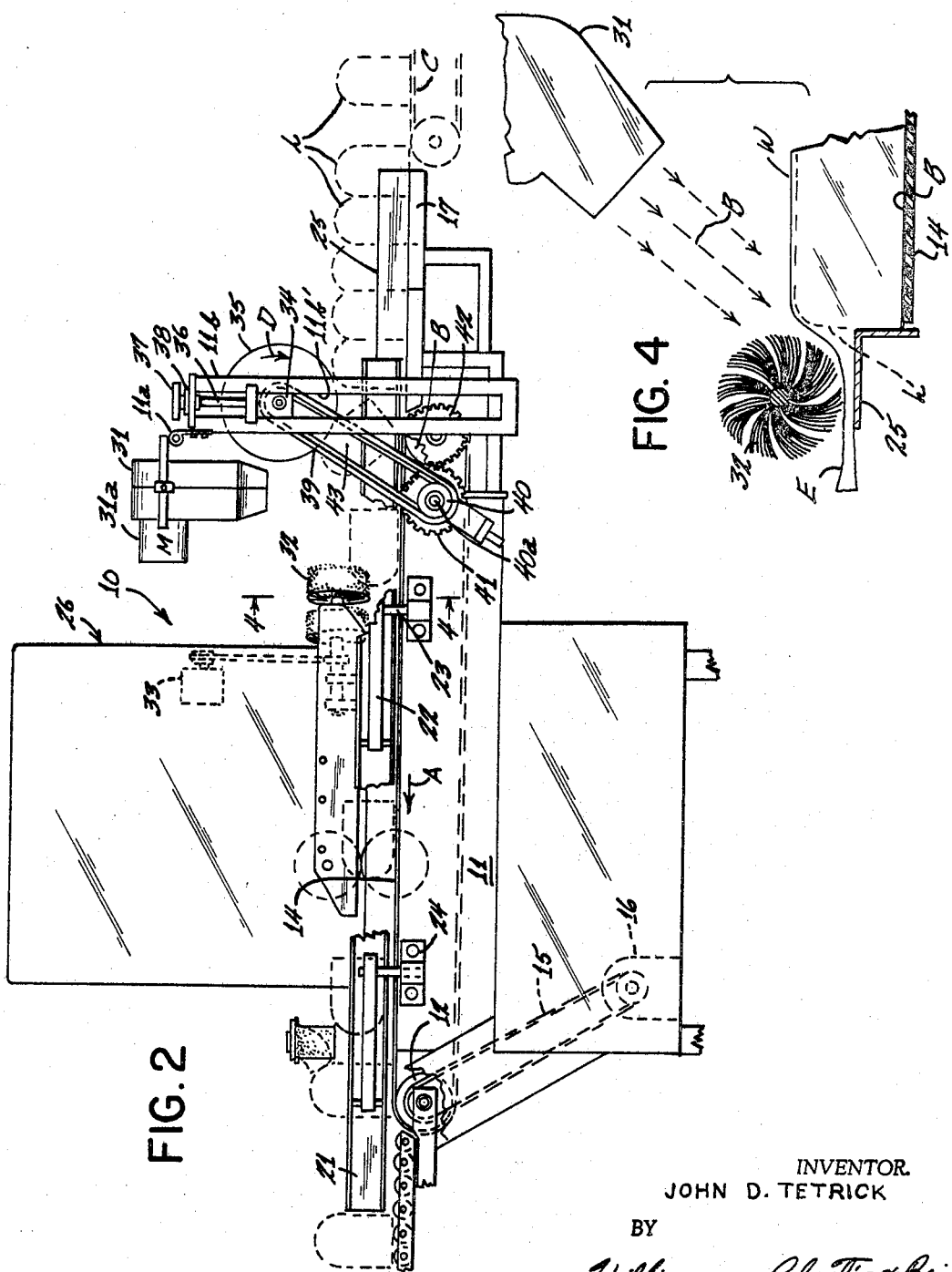

United States Patent Office 3,481,106
Patented Dec. 2, 1969

---

3,481,106
WRAPPER CLOSING APPARATUS
John D. Tetrick, White Bear Lake, Minn., assignor to Doughboy Industries, Inc., New Richmond, Wis., a corporation of Wisconsin
Filed Nov. 13, 1967, Ser. No. 682,014
Int. Cl. B65b 51/08
U.S. Cl. 53—135                                            7 Claims

ABSTRACT OF THE DISCLOSURE

A bread wrapper closing apparatus wherein a soft roller tips the wrapped loaf onto its side. The open end of the wrapper is brushed flat and then gathered and tied, and a foam bar above the conveyer engages the wrapped loaf to again right the loaf.

BRIEF SUMMARY OF INVENTION

The bread wrapper closing apparatus receives a wrapped loaf of bread in upright position, then tips it over for more effective removal of the folds in and soothing of the open end of the wrapper. This flattened open end of the wrapper is then gathered and tied, and as the wrapped loaf is discharged to be trayed, the loaf is tipped up again. The wrapped loaf is initially tipped over by a soft foam roller engaging and forwardly propelling the top of the loaf to top the loaf onto a belt conveyor. The belt conveyor then carries the wrapped loaf along rotary brushes effecting smoothing and removal of the folds in the open end of the wrapper, and then along the gathering and tying mechanism to effect the closure. Finally, as the belt conveyor carries the wrapped loaf on its side for discharge, the upper side engages a stationary strip of resiliently flexible foam plastic which tips the wrapped loaf upright onto its bottom again as the conveyor continues to move the wrapped loaf along.

DESCRIPTION OF DRAWINGS

FIG. 1 is a perspective view of the invention with loaves of bread illustrated in dotted lines.

FIG. 2 is a front elevation view of the invention with portions thereof broken away for clarity of detail.

FIG. 3 is an enlarged detail view, partly in section, illustrating portions of the gathering and tying mechanism.

FIG. 4 is an enlarged detail section view taken approximately at 4—4 in FIG. 2.

FIG. 5 is a somewhat diagrammatic sketch showing the open end of the wrapper as it is directed into the gathering and tying mechanism.

DETAILED DESCRIPTION

One form of the invention is illustrated in the drawings and is described herein.

The wrapper closing apparatus is indicated in general by numeral 10 and is intended to perform the final closing and manipulating operations on loaves of bread which have been baked, sliced, and then put through an over-wrap machine using an extra-wide film. As the loaves L of bread are delivered to the apparatus 10 by the delivery conveyor C from the over-wrap machine, the wrapper W on each loaf will have been sealed to itself at the bottom of the loaf and will have been sealed at one end so that the wrapper per se has a shape comparable to a bag tightly fitting and encompassing the loaf of bread L, but having a generously long open end portion E.

The apparatus 10 includes a frame structure 11 upon which conveyor mounting drums 12 and 13 are journalled in suitable bearings for mounting the endless belt conveyor 14. Drum 12 is driven by a roller chain 15 from a suitable source of rotary power 16 which includes an electric motor and necessary speed reducing gearing. The belt conveyor 14 is moved in the direction of arrow A at a speed sufficient to convey up to 85 wrapped loaves L of bread there along in well spaced condition as illustrated per minute. The wrapped loaves L are delivered from conveyor C of the over-wrap machine onto a collecting and temporary storage deck 17, and then loaves L are moved over the deck 17 by one one loaf pushing against the other, receiving the impetus from the conveyor C. The deck 17 extends to the receiving end of the belt conveyor 14 so that the wrapped loaves may make a smooth transition from the deck to the conveyor.

Adjacent the delivery or discharge end of the belt conveyor 14, an outrigger frame 18 is attached to the frame 11 and is provided with a multiplicity of small rollers 19 over which the loaves L will pass by operation of gravity when the frame 18 is tilted downwardly in the manner illustrated in FIG. 1. Frame 18 also carries a tray 20 upon which the loaves are collected after being closed. The loaves of bread will be removed from the tray 20 and placed into suitable containers or on transportable trays for delivery to customers.

Adjacent the front side of the belt conveyor 14 and deck 17, an elongate rigid channel shaped loaf guide 21 is adjustably mounted as to be movable in a direction transversely of the belt conveyor so as to guide the sealed ends S of the loaves travelling along the deck and conveyor. The guide 21 is swingably connected to the ends of a pair of parallel mounting links 22, the opposite ends of which are adjustably secured to upright studs 23 which are affixed to the frame 11 by brackets 24.

The rear side of the deck 17 and belt conveyor 14 is relatively unobstructed so as to permit the long open end portion E of the wrapper W to extend beyond the side of the belt in this direction. A guide plate 25 is affixed to the frame 11 of the machine and is positioned slightly above the level of the deck 17 and belt conveyor 14 as to carry the extended end portion E of the wrapper at a position approximately midway through the thickness of the loaf L when the loaf is tipped on its side as illustrated in FIG. 4. The proper positioning of the open end E of the bag is necessary in order to permit the efficient and automatic handling of this end portion of the wrapper.

In producing a closure at the end E of the wrapper, a gathering and tying mechanism 26 is positioned at the rear or unobstructed side of the belt conveyor 14. The gathering and tying mechanism 26 is, of itself, previously known and may comprise the mechanism illustrated in United States Patent No. 3,242,633.

The illustration of all of the details of the gathering and tying mechanism 26 is not essential to the present disclosure and it is sufficient to point out that the end E of the wrapper is initially gathered, substantially as illustrated at E' in FIG. 3 and a piece P of plastic or paper covered wire in the form of a tape T is twisted around the gathered end E' at a location closely adjacent the end of the loaf L as to tightly fasten the wrapper W. The gathering and wrapping is very quickly accomplished, in a fraction of a second, and the essential parts of the gathering and tying mechanism are the tape supply and cutoff machines 27, the cooperating gathering wheels 28, and intermittently removable obstruction 29 to hold the end of the wrapper during gathering and tying, and the twister 30 which revolves the ends of the piece P of the tape. At the time the open end E of the wrapper W is fed into the gathering and tying mechanism 26, it is important that the end E be flattened and in as smooth condition, free of wrinkles, as is possible, substantially as illustrated in FIG. 5. In order to make the open end E as flat and free of wrinkles as possible, the apparatus 10 tips the wrapped loaves L onto their sides, as hereinafter more fully described, and then the ends E are subject to an intense strain of air B from fan 31 in a direction as to cause the end E to lie flat against the guide plate 25. The fan 31 has its own motor 31a and is supported in a predetermined position on a mounting rod 11a, which is carried by an upright sub-frame 11b attached to the main frame 11 of the machine. The fan may be suitably adjusted in various positions as to obtain the correct approach angle for the stream B of air.

After the open end E of the wrapper passes by the stream of air, it is subjected to the action of a pair of rotary bristle brushes 32 which are mounted in superimposed relation with the guide plate 25 and adjacent the gathering and tying mechanism 26. The rotary brushes 32 are driven from an independent source of rotary power such as motor 33 so as to gently draw the open end E of the wrapper into flattened wrinkle free condition as it moves along the guide plate 25 and is delivered into the gathering and tying mechanism 26.

The upright sub-frame 11b slidably mounts a bearing block 34 which carries a soft and resiliently compressible foam plastic roller 35, the periphery of which is somewhat rough because of the nature of the foam plastic and is thereby well adapted to frictionally engage the top of each wrapped loaf L of bread as it is moved along the deck 17 toward the conveyor 14. The roller 35 is turned in the direction of arrow D and the periphery of the roller 35 has a speed in exces of the linear speed of the belt conveyor 14.

The bearing block 34 is adjustable vertically in a guideway 11b' of the frame 11b and is connected to a vertical rotary screw 36 with a narrowed handle 37 at its upper end. The screw 36 turns in a stationary nut 38 carried at the top of the sub-frame 11b as to facilitate vertical adjustment of the bearing block 34 and roller 35 by turning the narrowed handle 37.

The roller 35 has a pulley affixed on the rotary shaft thereof and is driven by a belt 39 from a pulley 40 on a jack shaft driven by a gear 41 meshed with gear 42 which is affixed to the shaft of conveyor roller 13. The jack shaft 40a is carried in a bearing mounted on a frame bar 43 which is mounted on a suitable bearing on the shaft of roller 35 so as to maintain the drive belt 39 under suitable tension.

Adjacent the discharge or delivery end of the belt conveyor 14, a rigid bar or frame element 43 is positioned above the belt 14 and extended transversely thereacross.

The bar 43 is mounted on a vertically adjusted stem 44 in a rigid tube 45 affixed to the frame 11. A set screw 45a retains the stem 44 in the desired position, but permits adjustment thereof.

Bar 43 has a strip 46 of soft and flexible resilient foam plastic affixed at the lower side thereof and depending toward the belt conveyor 14. The strip 46 of plastic is spaced above the belt conveyor so as to engage the upper side of a wrapped loaf carried on conveyor 14, substantially as illustrated in FIG. 2. The porous or coarse nature of the foam plastic restrains motion of the upper side of the wrapped loaf and as the belt conveyor 14 continues to move the lower side of the loaf along, the loaf will be tipped to an upright position again. The loaf will then be discharged off the end of conveyor 14 and onto the rollers 19.

It will, of course, be understood that various changes may be made in the form, details, arrangement and proportions of the various parts without departing from the scope of my invention.

What I claim is:

1. Apparatus for closing the end of a bread wrapper, comprising an endless conveyor for carrying the wrapped loaves of bread,
   a loaf receiving support over which the wrapped loaves are moved toward the conveyor,
   a loaf propelling elment spaced above the support adjacent the conveyor, said propelling element moving rapidly toward the conveyor and engaging the top of each wrapped loaf and tipping the wrapped loaf onto its side and onto the conveyor,
   means at the side of the conveyor effecting, after said tipping of the loaf, successive smoothing, flattening, gathering and tying of the open end of the wrapper,
   and means tipping the wrapped and tied loaves into upright position again.

2. The apparatus according to claim 1 and said loaf propelling element comprising a roller of resilient foam plastic to frictionally engage and urge the top of the raised loaf in the direction of the conveyor and thereby tip the loaf onto its side.

3. The apparatus according to claim 1 and said endless conveyor including a loaf supporting endless belt,
   and said loaf tipping means including a frame element extending across and spaced above the discharge end of said belt conveyor and having a depending strip of resiliently flexible foam plastic material engaging the top side of the wrapped and tied loaves and cooperating with the belt conveyor in tipping the loaves into upright position.

4. The apparatus according to claim 2 and adjustable means mounting said roller above the support for varying the vertical positioning of the roller in accordance with the size of loaves wrapped to provide the desired pressure with which the roller engages the top of the wrapped loaves.

5. Apparatus for closing the open end of a bread wrapper,
   comprising an endless belt conveyor for carrying the wrapped loaves of bread,
   a loaf receiving deck over which the wrapped loaves are moved toward the conveyor,
   a loaf propelling roller of resiliently compressible foam plastic spaced above the deck adjacent the conveyor, the lower periphery of the roller moving rapidly in the direction of the conveyor and engaging the top of each wrapped loaf and tipping the wrapped loaf onto its side and onto the conveyor,
   means at the side of the conveyor and intermediate the ends thereof effecting successive smoothing, flattening, gathering and tying of the open end of the wrapper of each loaf tipped on its side and moved along with the conveyor,
   a frame element spaced above the conveyor adjacent the discharge end thereof, and a broad strip of soft foam plastic on the frame element and depending therefrom to be engaged and flexed by each wrapped loaf carried on its side by the conveyor and thereby cooperate with the conveyor in tipping the wrapped and tied loaves into upright position again.

6. The apparatus according to claim 5 and said roller being revolved at a rate at which the peripheral speed of the roller exceeds the linear speed of the conveyor to assure tipping of the loaves forwardly along the conveyor.

7. Apparatus for closing the open end of a bread wrapper, comprising a loaf supporting medium unobstructed at one side to permit the open ends of the wrappers to extend outwardly there beyond and including an endless conveyor carrying the wrapped loaves of bread, a loaf propelling element spaced above the supporting medium adjacent the loaf receiving end of the conveyor, said propelling element moving in the same direction as the conveyor at a rate exceeding the linear speed of the conveyor and tipping each of the wrapped loaves onto its side on the conveyor, means at the unobstructed side of the conveyor effecting successive smoothing, flattening, gathering and tying of the open end of the wrapper, and means tipping the wrapped and tied loaves into upright position again.

References Cited

UNITED STATES PATENTS

| 3,242,633 | 3/1966 | Platt et al. | 53—135 |
| 3,008,280 | 11/1961 | Barkman | 53—379 |

THERON E. CONDON, Primary Examiner

N. ABRAMS, Assistant Examiner

U.S. Cl. X.R.

53—367